United States Patent [19]

Schmidt et al.

[11] 4,236,314
[45] Dec. 2, 1980

[54] ELECTROMECHANICAL FILLING-LEVEL MEASUREMENT

[75] Inventors: Klaus Schmidt, Schopfheim; Klaus Grass, Murg, both of Fed. Rep. of Germany

[73] Assignee: Endress u. Hauser GmbH u. Co., Maulburg, Fed. Rep. of Germany

[21] Appl. No.: 947,105

[22] Filed: Sep. 29, 1978

[30] Foreign Application Priority Data

Oct. 5, 1977 [DE] Fed. Rep. of Germany ... 7730802[U]
Oct. 5, 1977 [DE] Fed. Rep. of Germany ... 7730819[U]

[51] Int. Cl.³ .............................................. G01B 3/10
[52] U.S. Cl. ................................. 33/126.6; 73/290 R
[58] Field of Search .................... 33/126.5, 126, 126.6, 33/137R; 73/290 R, 298; 116/113

[56] References Cited

U.S. PATENT DOCUMENTS

| | | | |
|---|---|---|---|
| 2,754,596 | 7/1956 | O'Brien, Jr. | 33/126.6 |
| 3,128,557 | 4/1964 | Childs | 33/126.6 |
| 3,473,380 | 10/1969 | Mayer et al. | 33/126.6 |
| 3,500,546 | 3/1970 | Pilcher | 33/126.6 |
| 3,708,159 | 1/1973 | De Bray | 73/290 R |

*Primary Examiner*—Willis Little
*Attorney, Agent, or Firm*—Gerald J. Ferguson, Jr.; Joseph J. Baker

[57] ABSTRACT

An electromechanical filling level measuring apparatus for the intermittent measurement of the filling level in a container with the help of a measuring tape that is wound on a spool driven by an electric motor and to the lower end of which a sensing weight is secured. Switching means are provided for the reversal and for the switching off of the electric motor that respond respectively when the sensing weight encounters the surface of the filling medium during paying-out of the measuring tape and when an upper limiting position is reached during the winding-in of the measuring tape. A detector device determines and indicates the length of the measuring tape paid out or wound in. A housing is fitted to the top of the container and is divided by a barrier wall into a measuring tape chamber containing the measuring tape spool, that is in communication with the interior of the container by way of a through-guide for the measuring tape and a chamber containing the electric motor, the switching devices and the detector device. On the underside of the housing is a fixed guide sleeve, in which a tube through which the measuring tape passes is mounted for limited vertical movement against the force of a spring, a carrier for the tube being fastened to the end of the measuring tape. The tube consists of metal and extends out of the upper end of the guide sleeve into the measuring tape re chamber, in which there is provided an inductive proximity switch so arranged within the range of movement of the metal tube as to respond to its passage.

13 Claims, 6 Drawing Figures

ELECTROMECHANICAL FILLING-LEVEL MEASUREMENT

This invention relates to an electro-mechanical filling level measuring apparatus for intermittent measurement of the filling level in a container with the help of a measuring tape that is wound on a measuring tape spool driven by an electric motor and to the lever end of which there is fastened a sensing weight is secured, with switching means for reversing or turning off the electric motor which respond when the sensing weight encounters the surface of the filling medium during paying out of the measuring tape or reaches an upper limit during winding in of the measuring tape, a detector device for determining and indicating the paid out or wound in length of the measuring tape, including a housing fitted to the top of the container that is divided by a barrier wall into a measuring tape chamber in communication with the interior of the container by way of a through-guide for the measuring tape and a chamber containing the electric motor, the switching means and the detector, and having fixed to the underside of the housing a guide sleeve in which a tube through which the measuring tape passes is mounted for limited vertical movement against the force of a spring, and with a carrier for the tube fixed to the lower end of the measuring tape.

In a filling level measuring apparatus of this kind known from U.S. Pat. No. 3,128,557 the guide sleeve extends from the underside of the housing downwardly into the container and the tube, that is substantially shorter than the guide sleeve, extends downwardly from the lower end of the guide sleeve, so that its lower end is engaged by the carrier fixed to the measuring tape when this moves upwardly and is displaced upwardly into the guide sleeve against the force of the spring arranged within the guide sleeve until the switch means for turning off the electric motor responds. This switching means is formed by a torque sensor coupled with the drive shaft of the electric motor, and responds on the one hand to the reduction of torque when the sensor weight encounters the surface of the filling medium to reverse the electric motor, and on the other hand to the increase in torque which occurs at the end of the winding-in operation when the carrier engages the tube and moves upwards against the force of the spring. Switching means of this kind are relatively complicated and expensive mechanical constructions, which additionally require careful setting-up in order to adapt them to the torque conditions actually present at any time. Since the torque conditions may alter during operation, particularly with filling media which may give rise to the formation of deposits, there exists a considerable danger of defective operation which may lead either to a false indication of the filling level or even to damage to the apparatus, if the electric motor is not correctly switched off at the end of the winding-in operation.

It is known from German Gebrauchsmuster No. 7 031 884 to arrange, in an electromechanical filling level measuring apparatus of a similar kind, that to switch off the electric motor at the end of the winding-in operation a switch lever is engaged and pivoted by a carrier secured on the measuring tape; this switch lever actuates a switch that turns off the electric motor. The switch lever constitutes a mechanically movable element that is placed within the measuring chamber which is in communication with the interior of the container. Electromechanical filling level measuring arrangements of this kind are however often employed for the measurement of filling of materials which are inclined to form dust and deposits. It is therefore essential to separate the measuring tape chamber from the remaining portion of the housing of the measuring apparatus in a dust-tight and if possible also a pressure-tight manner by the barrier wall, to introduce as few movable parts as possible into the measuring band chamber exposed to dust and the formation of deposits, such parts as are so introduced being insensitive to dust and to the formation of deposits, and to place all sensitive mechanical and electrical elements in the part of the housing protected by the barrier wall. With the use of a mechanical switch lever arranged in the measuring tape chamber there exists the danger that it may be operated too soon as a result of friction arising from the formation of deposits, or that the formation of deposits may prevent the pivoting of the switch lever and thus the switching off of the electric motor.

Finally there is known from published German patent application AS No. 2 151 094 to suspend the electric motor arranged in the protected part of the housing for free pivotal movement about the shaft of the tape spool, so that it acts as a counterweight for the torque exerted on the tape spool by the sensing weight. The alterations of this torque occuring when the sensing weight encounters the surface of the filling medium or when it reaches its upper limiting position thus gives rise to a pivotal movement of the electric motor; switches are arranged within the pivoting range of the electric motor so that upon pivoting of the electric motor out of its counterweight position corresponding to the freely suspended sensing weight they are actuated to switch off or reverse the electric motor. In this construction no movable parts other than the measuring tape spool are present in the measuring tape chamber; all of the mechanically and electrically sensitive parts are disposed in the protected part of the housing. This arrangement also provides reliable reversal of the electric motor for the lower limiting position of the sensing weight. On switching off in the upper limiting position, however, disturbing pendular movements of the electric motor may occur, though which a switch may be actuated at the wrong time.

The object of the invention is to provide an electromechanical filling level measuring apparatus of the kind set forth above that by means of a simple mechanical construction ensures the reliable switching off of the electric motor at the upper limiting position with low mechanical stressing of the measuring tape and is insensitive to dust and to the formation of deposits.

According to the present invention there is provided an electromechanical filling level measuring apparatus for the intermittent measurement of the filling level in a container with the help of a measuring tape that is wound on a spool driven by an electric motor and to the lower end of which a sensing weight is secured, together with switching means for the reversal and for the switching off of the electric motor that respond respectively when the sensing weight encounters the surface of the filling medium during paying-out of the measuring tape and when an upper limiting position is reached during the winding in of the measuring tape, a detector device for determination and indication of the length of the measuring tape paid out or wound in, including a housing fitted to the top of the container, that is divided by a barrier wall into a measuring tape chamber containing the measuring tape spool that is in communication with the interior of the container by way of a through-guide for the measuring tape, and a chamber containing the electric motor, the switching devices and the detector device, and having on the underside of the housing a fixed guide sleeve, in which a tube through which the measuring tape passes is mounted for limited vertical movement against the force of a spring, a carrier for the tube being fastened to the end of the measuring tape, and wherein the tube consists of metal and extends out of the upper end of the guide sleeve into the measuring tape chamber in which there is provided an inductive proximity switch so arranged within the range of movement of the metal tube as to respond to its passage.

In a filling-level measuring apparatus according to the invention the upward movement of the metal tube is made use of to initiate the switching-off process. Switching off is thus effected independently of the prevailing torque conditions exclusively as a result of the sensing weight reaching its upper limiting position. No additional mechanically movable elements are disposed within the measuring tape chamber subject to dust and the formation of deposits; the inductive proximity switch responsive to the upward movement of the metal tube is wholly insensitive to dust and to the formation of deposits.

In addition, the metal tube has the additional function that it limits the upward movement of the sensor weight as a result of the spring action and damps the resulting shock, so that the measuring tape is treated carefully and protected from damage.

In accordance with a preferred embodiment the filling level measuring apparatus includes a vertically compressible bellows, of which the upper margin is connected sealedly to the lower end of the guide sleeve and the lower margin to the lower end of the metal tube. This bellows prevents the entry of dust and dirt into the interspace between guide shell and metal tube.

By means of a vertically compressible bellows arranged in the interior of the measuring tape chamber, the lower margin of which is connected sealedly to the upper end of the guide shell and its upper end to the metal tube, the sealing obtained in this manner can be still further improved.

In a preferred embodiment of the invention the lower end of the metal tube is provided with an extension piece to which there are fitted two stripper blocks applied to opposite sides of the tape, which are offset in height with respect to one another. On the one hand these stripper blocks effect a cleaning of the measuring tape by stripping-off adherent filling medium, and on the other hand they effect the guiding of the measuring tape, by means of which the measuring tape is held in an exactly defined plane, so that in the region lying above the stripper blocks it can neither be turned nor execute pendular movements.

As a result of the exact guiding of the measuring tape effected by the stripper blocks, a further modification of the filling level measuring apparatus becomes possible, which consists in securing above the stripper blocks on each side of the measuring tape two leaf springs offset in height in relation to one another, of which the downwardly directed edges are applied to the opposite sides of the measuring tape. These leaf springs effect an addition, very thorough cleaning of the measuring tape from adherent filling medium.

In filling level measuring arrangement of the kind described above the measuring tape spool is usually secured on a shaft passing through the barrier wall and it consists of a cylindrical core, upon which the measuring tape is wound, arranged between two side discs.

As the measuring tape there is usually employed a thin, flexible steel tape. The container or silo, in which the filling-level measuring apparatus is to be employed, may often be of considerable height; in order that the measuring operation can be carried out in a short time the paying out and winding in of the measuring band is effected at a high speed. As a result of the inertia of the movable parts there exists the danger that upon reversal or switching off of the electric motor the measuring tape spool will continue its rotation, which has the result that the winding of the measuring tape wound upon the spool will become loosened, so that it may jump over the spool cheeks. This tendency is enhanced by the intrinsic elasticity of the steel tape used. There may thus result a tangle of tape in the measuring tape chamber which makes the apparatus unusable.

In accordance with a preferred embodiment of the filling level measuring apparatus in accordance with the invention a collapse of the tape winding and tape tangling resulting therefrom is definitely avoided by providing on the barrier wall a projection which embraces the measuring tape spool over more than half its circumference.

When the measuring tape spool is inserted in this embodiment, it forms together with the projection formed on the barrier wall a kind of closed cassette, which is open at one side, so that the measuring tape can be led out. Even when the winding of tape on the spool becomes loose it cannot emerge from the enclosed space between the spool cheeks, the turns of tape are held in this enclosed space and are pulled tight again upon reversal of the direction of rotation. The turns of tape therefore cannot fall off the spool and tape tangling is definitely prevented. On the other hand the tape spool can easily be inserted and removed without hindrance.

Preferably the projection on the barrier wall embraces some 270° of the tape spool.

A further improvement of this embodiment of the invention consists in that the side sheek of the tape spool that is remote from the barrier wall has a larger diameter than than that nearer the barrier wall, the inner diameter of the projection being smaller than the diameter of the larger side sheek and the height of the projection being chosen such that the larger side cheek of the spool overlies the outer face of the projection.

This construction allows the space containing the measuring tape to be still better enclosed.

The invention will now be further described with reference to the accompanying drawings, of which:

Figure 2:
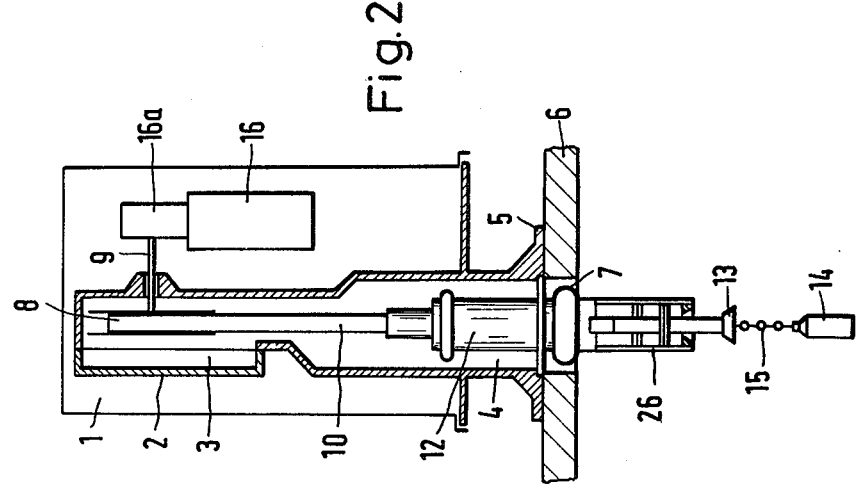
FIG. 2 show a partly sectional end elevation of the apparatus shown in FIG. 1.
Figure 1:
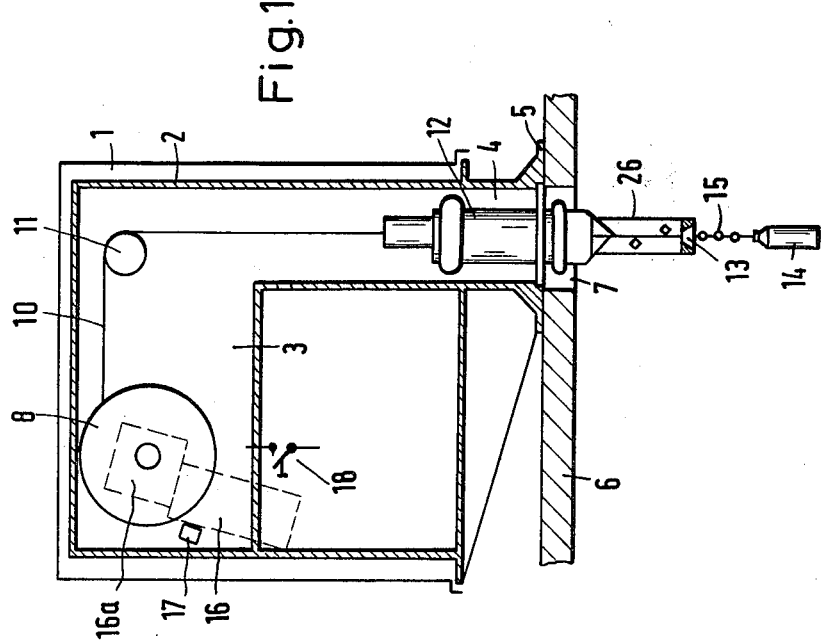
FIG. 1 shows a partly sectional side elevation of a filling level measuring apparatus embodying the invention.

The electromechanical filling level measuring apparatus shown schematically in FIGS. 1 and 2 of the drawings is intended for fitting to the top of a container, in which the filling level must intermittently be measured. The filling level measuring apparatus is contained in a housing 1, which is divided by a barrier wall 2 into a measuring tape chamber 3, which is sealed in a dust-tight manner from the remaining space within the housing 1, and is if necessary also sealed to be pressure-tight. The measuring tape chamber 3 is formed with a downwardly extending tubulation 4, at the lower end of which is formed a flange 5 by means of which the whole apparatus may be fastened to the upper closure wall 6 of a container, so that the tubulation 4 lies above an opening 7 in the closure wall 6.

In the interior of the measuring tape chamber 3, a measuring tape spool 8 is fitted on a shaft 9 led sealedly through the barrier wall 2. In the measuring tape spool 8 there is wound a measuring tape 10 that is led over a measuring roller 11 and led downwardly into the container through a guide 12 in the lower part of the tubulation 4. At the lower end of the measuring tape 10 there is provided a carrier 13 in the form of an upwardly tapering wedge. A sensor weight 14 is suspended from the carrier 13 by means of a chain 15.

In the part of the housing 1 separated and protected from the measuring tape chamber 3 by the barrier wall 2 there is arranged an electric motor 16 for driving the tape spool 8. The electric motor 16 is pivotally suspended from the shaft 9, so that it acts as a counterweight for the torque exerted by way of the measuring tape spool 8 on the shaft 9. In the illustrated embodiment the electric motor 16 is a geared motor the gear shaft of the redunction gear 16a, which extends perpendicularly to the motor shaft, coinciding with spool shaft 9. A stop 17 limits the pivotal movement of the electric motor 16 in the clockwise direction (FIG. 1); the stop 17 is arranged so that with the feeler weight 14 freely suspended, as a result of the torque exerted by this the electric motor lies agaitn this stop 17 at a certain slanting position. With a reduction of this torque, particularly when the sensor weight encounters the surface of the filling medium, the electric motor 16 may pivot away from the stop 17 (in an anticlockwise direction in FIG. 1). A switch 18 is arranged within the range of pivotal movement of the electric motor 16 so that it is actuated by this pivotal movement of the electric motor 16.

With the measuring roller 11 there is coupled a detector device (not shown), for example a pulse generator formed by an inductive switch, in order to indicate the rotations of the measuring roller and thus the length of the measuring tape 10 that is wound in or paid out.

Figure 3:
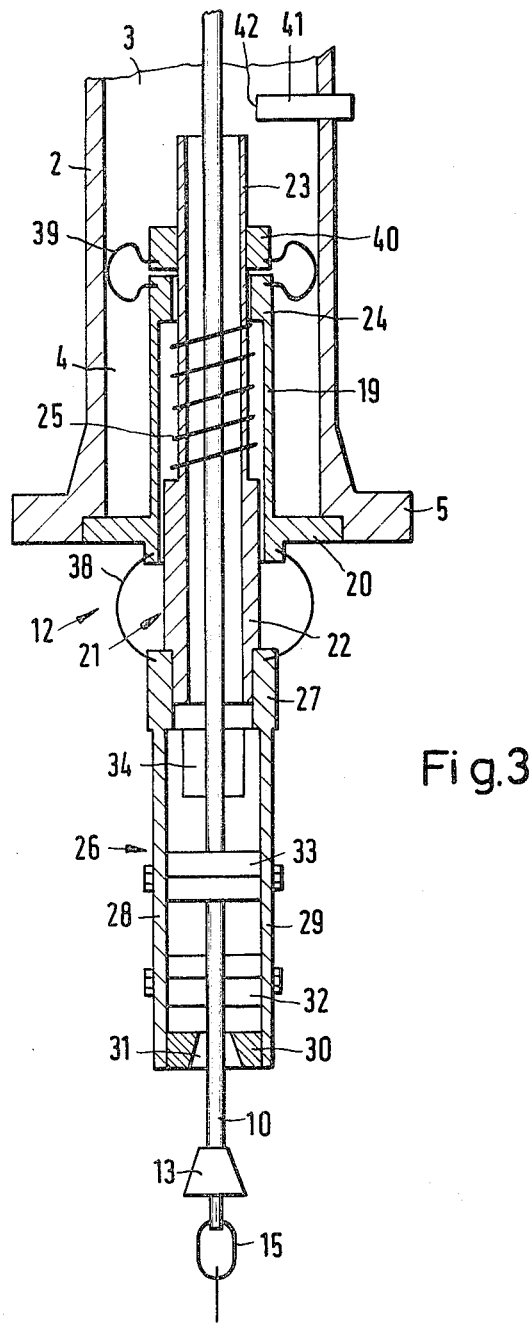
FIG. 3 shows to a larger scale a sectional side elevation of a portion of the apparatus of FIGS. 1 and 2.

In FIG. 3 the through-guide 12 is shown more exactly in a cross-sectional view. In the lower part of the tubulation 4 a guide sleeve 19 is secured by means of an integral flange portion 20. A metal tube 21 is mounted for vertical movement within the guide sleeve 19. The metal tube 21 has a lower portion 22 of increased wall thickness, the external diameter of which is matched to the internal diameter of the guide sleeve and in all positions extends beyond the lower end of the guide sleeve 19, and an upper portion 23 of smaller wall thickness which in all positions of the metal tube extends upwardly beyond the upper end of the guide sleeve 19. At the upper end of the guide sleeve 19 there is formed a portion 24 of reduced internal diameter, which guides the upper portion 23 of the metal tube. Between the shoulders formed by the different diameters of the metal tube 21 and of the guide sleeve 19 there is inserted a helical compression spring 25, which urges the metal tube 21 towards its lower limiting position.

To the lower end of the metal tube 21 there is fastened a downwardly projecting extension member 26, the upper end of which is constructed as a coupling ring 27 rigidly coupled to the metal tube. The coupling ring is prolonged by two parallel spaced-apart downwardly extending bars 28, 29, to the lower end of which there is secured a stop member 30. The stop member 30 has a central opening 31, through which the measuring tape 10 is led. The inner walls of the opening 31 form and inwardly tapering slot which matches the form of the carrier 13.

Above the stop member 30 there are arranged between the two bars 28 and 29 two stripping blocks 32, 33 staggered in height in relation to one another and arranged so that they lie on opposite sides of the measuring tape 10. These stripping blocks consist for example of a plastics material. As may be seen from FIG. 4, each stripper block has an approximately square cross-section and is fastened so that it touches the measuring tape with one corner and deflects the measuring tape slightly out of its rectilinear path of movement.

Figure 4:
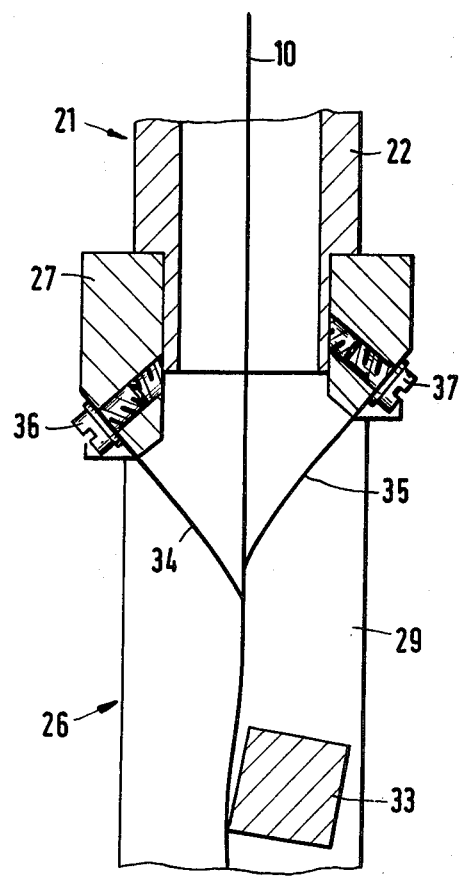
FIG. 4 shows to a still larger scale a sectional side elevation of a leaf-spring tape cleaning device included in the tape guide.

As may be seen from FIG. 4, there are fastened to the coupling ring of the extension member 26, above the upper stripper block 33, by means of screws 36 and 37, two leaf springs 34, 35 which are directed inclinedly against the measuring tape 10 so that their rectilinear lower edges touch the opposite sides of the measuring tape at positions slightly vertically offset from one another.

An annular bellows 38, of which the height may be varies, has its upper margin secured to the lower end of the guide sleeve 19 and its upper margin secured to the coupling ring 27. The bellows 38 allows vertical movement of the metal tube 21 in the guide sleeve 19, by which it is correspondingly deformed; it seals the interspace between the metal tube 21 and the guide sleeve 19 from the interior of the container.

A similar bellows 39 has its lower margin secured to the guide sleeve 19 and its upper margin to a collar 40 fixed on the metal tube 21. The bellows 39 seals the interspace between the metal tube 21 and the guide sleeve 19 from the measuring tape chamber 3. The bellows 38 and 39 thus prevent the entrance of dust and dirt into the interspace between the metal tube 21 and the guide sleeve 19. The collar 40 also serves to limit the downward movement of the metal tube 21 in the guide sleeve 19, because it abuts against the upper end of the section 24 of the guide sleeve, as is illustrated in FIG. 3.

An inductive proximity switch 41 is secured in the measuring tape chamber 3 so that its active end surface 42 is at a little distance from the path of movement of the upper section 23 of the metal tube projecting upwardly out of the guide sleeve, and is situated somewhat above the upper end of the metal tube when this assumes its lower limiting position, but so that during its upward movement the metal tube passes closely adjacent to the active end surface 42 of the inductive proximity switch 41. The inductive proximity switch 41 is mounted in a dust- and pressure-tight manner in the barrier wall 2.

The inductive proximity swtich responds to the passage of members of any metal, so that a reliable response is assured; it is however arranged that the metal tube 21, or at least the portion 23 of this tube that cooperates with the inductive proximity switch 41, is made of a magnetisable metal, preferably of steel.

The filling level measuring apparatus described above operates in the following manner. In the quiescent condition the parts assume the positions shown in FIG. 1, in which the wedge-shaped carrier 13 is engaged in the central opening in the stop member 30 and the electric motor 16 lies against the stop 17. To carry out a filling level measurement the electric motor 16 is set going, which drives the measuring tape spool 8 so that the measuring tape 10 is paid out. The sensor weight 14 thus moves downwardly within the container. The electric motor 16 is held further against the stop 17 by the torque exerted by the freely hanging sensor weight 14. The unwinding measuring tape 10 drives the measuring roller 11. When the sensor weight 14 impinges on the surface of the filling medium the measuring tape 10 is unloaded; the electric motor then pivots in the anticlockwise direction, as seen in FIG. 1, so that the switch 18 is actuated. The measuring tape spool 8 is therefore driven in the opposite direction and the measuring tape 10 is wound up again. As soon as the sensor weight 14 has left the surface of the filling medium the electric motor again abuts against the stop 17. During its upward movement the measuring tape 10 is freed from a part of the adherent filling medium by the stripper blocks 32, 33 and in particular, is so guided by them that it cannot rotate and runs in an exactly defined plane above the stripper blocks 32, 33. The leaf springs 34, 35 that engage the tape above the stripper blocks 32, 33 clean the residual adherent dirt from the measuring tape, so that practically no dirt is carried by the measuring tape into the measuring tape chamber 3. During the unwinding and winding up operations the parts of the through-guide 12 take up the positions represented in FIG. 3; in particular the upper end of the metal tube 21 is situated below the level of the inductive proximity switch 41. When the carrier 13 engages in the opening of the stop member 30, it carries the stop member with it during its further upward movement. This movement is transmitted through the extension member 26 to the metal tube 21, which is thus moved upwardly in the guide sleeve 19 against the force of the helical compression spring 25. When the upper end of the metal tube 21 moves in front of the active end surface 42 of the inductive proximity switch 41, the inductive proximity switch 41 responds and this response is used to switch off the electric motor 16. All the components of the measuring apparatus then reassume the positions shown in FIG. 1. The inductive proximity switch 41 is naturally arranged so that the switching off of the electric motor 16 is effected before the coupling ring 27 strikes the lower end of the guide sleeve 19.

In the final phase, the upward movement is gently braked by the helical compression spring 25, so that impact and excessive mechanical stresses are avoided. Because of the progressively increasing torque, the electric motor is pressed more firmly against the stop 17, without pendular movements. When the electric motor is turned on at the beginning of the next measurement operation the effect of the gradually unloaded helical compression spring is that the alterations of torque occassioned by the inertia of the moving sensor weight is compensated, so that the electric motor 16 remains pressed against the stop 17 without pendular movements taking place. The switch 18 therefore cannot be actuated too early.

After the switching off of the electric motor at the upper limiting position the wedge-shaped carrier 13 is also held firmly in the opening 31 of the stop member 30 by the resilient bias of the helical compression spring 25. It is thus ensured It is thus ensured that pendular movements of the sensor weight 14 hanging on the chain 15 are resistend and not transmitted to the measuring tape 10.

Figure 5:
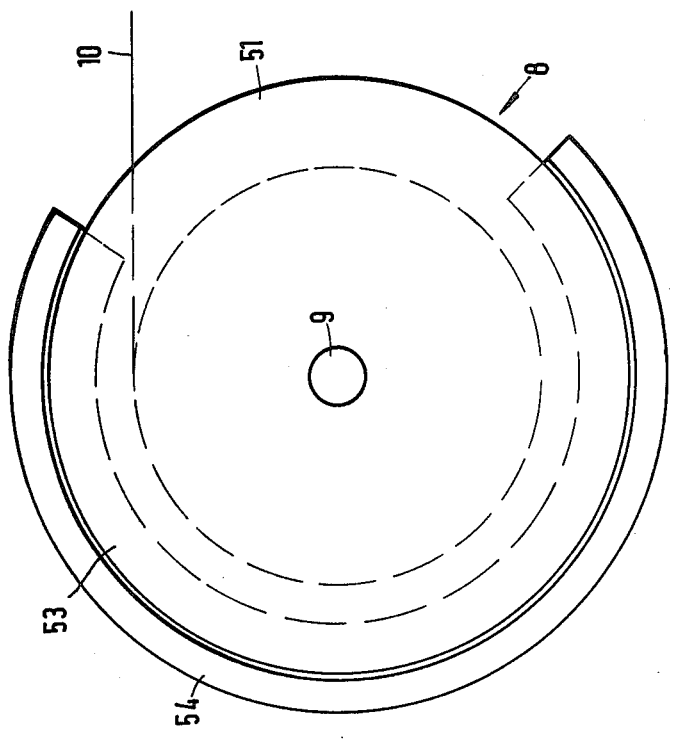
FIG. 5 shows a front elevation of a preferred construction of measuring tape spool that may be used in apparatus according to the invention.
Figure 6:
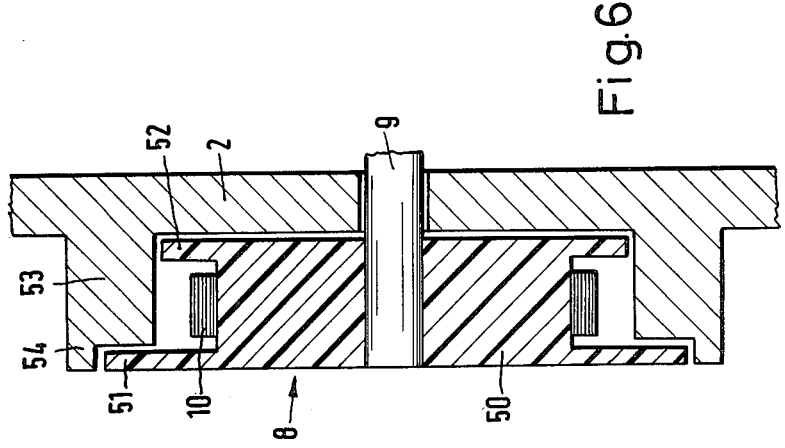
FIG. 6 shows an axial cross-section of the tape spool of FIG. 5.

A preferred embodiment of the measuring tape spool 8 is represented in FIGS. 5 and 6. These figures show again the shaft 9, which passes through the part of the barrier wall 2 lying between the measuring tape spool and the electric motor, and the measuring tape 10. The measuring tape spool 8 consists of a cylindrical core 50, on which the measuring tape 10 is wound, and two side cheeks 51 and 52. In contrast to usual tape spools, in which the side cheeks are of the same size, the side cheek 51 remote from the wall 2 has a greater diameter than the cheek 52 which is nearer the wall.

On the wall 2 is formed a projection 53, which has the form of a portion of a cylindrical ring. The internal diameter of the cylindrical ring is slightly greater than the external diameter of the smaller side cheek 52, but is smaller than the external diameter of the large side cheek 51. The height of the projection 53 at its inner periphery is made such that the end face is opposed at a small distance to the peripheral portion of the side cheek 51. On its outer periphery, on the other hand, there is formed a peripheral projection 54, which surrounds the periphery of the outer side cheek 51 at a small distance, and of which the outer face is substantially level with the outer face of the measuring tape spool 8.

As may be understood from FIG. 5, the projection 53 embraces the measuring tape spool 8 over more than half its circumference, in the illustrated example over 270°.

As may be understood particularly from the sectional view of FIG. 6, the inner peripheral wall of the projection 53, together with the two cheeks 51 and 52 bounds a generally enslosed space, in which the wound-up measuring tape 10 is contained. If the turns of the measuring tape become loose they can at the most lie against the inner peripheral wall of the projection 53, but can in no case fall off the spool over the side cheek 51. Tape tangling is thus completely prevented.

On the other hand the measuring tape spool 8 can be placed on the shaft 9 or removed from it without hindrance.

What we claim is:

1. In an electromechanical filling level measuring apparatus for the intermittent measurement of the filling level in a container including a spool, a measuring tape that is wound on the spool and to the lower end of which a sensing weight is secured, an electric motor for driving the spool, switching means for the reversal and for the switching off of the electric motor that respond respectively when the sensing weight encounters the surface of the filling medium during paying-out of the measuring tape and when an upper limiting position is reached during the winding-in of the measuring tape, a detector device for determination and indication of the length of the measuring tape paid out or wound in, a through-guide member, a housing fitted to the top of the container, the housing being divided by a barrier wall into (a) a measuring tape chamber containing the measuring tape spool, that is in communication with the interior of the container by way of the through-guide member for the measuring tape, and (b) a chamber containing the electric motor, the switching means and the detector device, the through-guide member being on the underside of the housing and including a fixed guide sleeve, a tube through which the measuring tape passes and a spring, the tube being mounted for limited vertical movement against the force of the spring, and a carrier for the tube being fastened to the end of the measuring tape, the improvement wherein the tube consists of metal and extends out of the upper end of the guide sleeve into the measuring tape chamber and an inductive proximity switch so arranged within the range of movement of the metal tube as to respond to its passage.

2. Apparatus in accorance with claim 1 and including a vertically deformable bellows, of which the upper margin is connected to the lower end of the guide sleeve and the lower margin to the lower end of the metal tube.

3. Apparatus in accordance with claim 1 or claim 2 and including within the measuring tape spool chamber a vertically deformable bellows of which the lower margin is sealedly secured to the upper end of the guide sleeve and the upper margin to the metal tube.

4. Apparatus in accordance with any one of claims 1 or 2, wherein there is provided at the lower end of the metal tube an extension member to which there are fitted two stripper blocks touching opposite sides of the measuring tape, which are mutually offset in height.

5. Apparatus in accordance with claim 4 wherein two leaf springs mutually offset in height are fastened to the through-guide members on each side of the measuring tape above the stripper blocks, so that their downwardly directed edges touch the opposite sides of the measuring tape.

6. Apparatus in accordance with claim 1, wherein the carrier has the form of an upwardly tapering wedge and there is fitted to the lower end of the extension member a receiving member for the carrier, having a wedge-shaped internal surface.

7. Apparatus in accordance with claim 1, wherein the electric motor is suspended pivotally from the measuring tape spool shaft as a counterweight, a switch being arranged within the range of pivotal movement of the electric motor so that it is actuated by pivotal movement of the electric motor resulting from unloading of the sensor weight, and that the opposite pivotal movement of the motor is limited by a stop so arranged that the electric motor lies against this stop when the sensor weight is freely suspended.

8. Apparatus in accordance with claims 1 or 7, in which the measuring tape spool is mounted on a shaft passing through the barrier wall and consists of a cylindrical core arranged between two side cheeks and upon which the measuring tape is wound, a projection from the barrier wall embracing the measuring tape spool about more than half its circumference.

9. Apparatus in accordance with claim 8 wherein the projection embraces the measuring tape spool through 270°.

10. Apparatus in accordance with claim 8, wherein the side cheek of the measuring tape spool more remote from the barrier wall has a greater diameter than the cheek nearer the wall, the internal diameter of the projection being smaller than the diameter of the larger spool cheek and the height of the projection being such that the peripheral portion of the larger cheek is opposed to the end face of the projection.

11. Apparatus in accordance with claim 10 wherein the periphery of the projection is formed to provide a rim embracing the larger spool cheek.

12. Apparatus in accordance with claims 1, 2 or 7 where said inductive proximity switch is disposed above the upper end of the guide sleeve.

13. Apparatus in accordance with claim 12 where said inductive proximity switch is mounted on said barrier wall.

* * * * *